(12) United States Patent
Gelorme et al.

(10) Patent No.: US 8,356,580 B2
(45) Date of Patent: Jan. 22, 2013

(54) SEAL HIGH TEMPERATURE ENVIRONMENT OF A BOILER ASSEMBLY

(75) Inventors: Jenifer R. Gelorme, Charlotte, NC (US); Thomas J. Rush, Charlotte, NC (US)

(73) Assignee: Rush Brands, LLC, Charlotte, NC (US)

( * ) Notice: Subject to any disclaimer, the term of this patent is extended or adjusted under 35 U.S.C. 154(b) by 1220 days.

(21) Appl. No.: 12/148,009

(22) Filed: Apr. 16, 2008

(65) Prior Publication Data

US 2008/0258399 A1 Oct. 23, 2008

Related U.S. Application Data

(60) Provisional application No. 60/923,712, filed on Apr. 16, 2007.

(51) Int. Cl.
*F24H 1/00* (2006.01)
*B23P 6/00* (2006.01)
*F16J 15/00* (2006.01)

(52) U.S. Cl. ............. 122/13.01; 29/890.031; 29/402.09; 277/654

(58) Field of Classification Search ............... 29/890.03, 29/890.031, 402.02, 402.09, 402.12; 277/626, 277/627, 650–654
See application file for complete search history.

(56) References Cited

U.S. PATENT DOCUMENTS

| 3,533,379 | A | * | 10/1970 | Martin et al. | 122/225 R |
|---|---|---|---|---|---|
| 4,321,101 | A | * | 3/1982 | Preiser et al. | 156/239 |
| 5,082,297 | A | * | 1/1992 | Flasher | 277/608 |
| 5,935,695 | A | * | 8/1999 | Baerveldt | 428/218 |

* cited by examiner

*Primary Examiner* — Sarang Afzali
(74) *Attorney, Agent, or Firm* — McNair Law Firm, P.A.; Douglas W. Kim

(57) ABSTRACT

A seal comprising a high temperature RTV silicone adhesive sealant layer; a first non-ceramic layer mounted to the RTV silicone adhesive sealant layer; a first expanded metal layer mounted to the first non-ceramic layer; a first silicone cloth layer mounted to the first expanded metal layer; a metal reinforcement layer mounted to the first silicone cloth layer to provide structural integrity without the use of ceramic materials; a second expanded metal layer mounted to the metal reinforcement layer; a second non-ceramic layer mounted to the second expanded metal layer; a turbine mesh layer mounted to the second non-ceramic layer; a second silicone cloth layer mounted to the turbine mesh layer; a sealing castable applied over the second silicone cloth layer to provide a covering; and, a high temperature bonding adhesive disposed between each layer following the first non-ceramic layer to bind the layers together.

13 Claims, 8 Drawing Sheets

SEAL HIGH TEMPERATURE ENVIRONMENT OF A BOILER ASSEMBLY

CROSS REFERENCE TO RELATED APPLICATION

This application claims priority from U.S. Provisional Application Ser. No. 60/923,712, filed Apr. 16, 2007.

FIELD OF THE INVENTION

This invention relates to a seal construction and method for high temperature sealing and more specifically to a system and method for sealing cracks and filling dead air spaces in the high temperature environment of a boiler assembly.

BACKGROUND OF THE INVENTION

During the operation of a boiler, many of the steam and water tubes expand and contract in response to the thermal effects caused by expansion and contraction. Therefore, the seals, such as those between dead air spaces and the boiler, have been difficult to maintain. Since steel is the principal material used for the construction of boilers, its inelasticity prevents a durable seal from being maintained because in stead of flexing to expand and contract, the material instead is prone to fracture. When cracks or other leaks exist in the boiler, flue-gas that may carry fly-ash, can enter through these leaks and settle in the dead air space or even travel into the boilerhouse. Leakages have an adverse effect on the efficiency of the operation of the boiler and it is therefore desirable to reduce if not eliminate the leakages which occur due to thermal expansion and contraction. Leakages cause excess air to be introduced within the boiler and can increase slagging, cause loss on ignition, increase the need for superheat or reheat attempt or spraying, and increase the corrosion within the boiler. Cracks and leaks have been responsible for upper-furnace slag problems due to excessive air in leakage through cracks and leaks in the penthouse floor. Repairs are frequently needed of the penthouse to remedy these cracks and leaks.

Historically, cracks and leaks have been repaired through welding the steel to contain the leak or crack. However, the weld itself is also subject to thermal expansion and therefore, does not maintain its integrity and when the boiler heats and cools, eventually more cracks and leaks develop.

One such product that has been useful in repairing these leaks is a product distributed under the trademark ISOMEMBRANE®. This product is available from High Temperature Technologies, Inc., a North Carolina corporation, and has been used in sealing cracks and leaks without losing its seal integrity due to thermal expansion and contraction. ISOMEMBRANE® is a flexible high temperature resistant seal. ISOMEMBRANE® has a sandwich construction consisting of layers of high density fibers (ISOBLANKET-E), high temperature adhesive (ISOBOND-E) and a sealing castable (ISOCOAT-E) to finish the surface. It is capable of sealing leaks and cracks in boilers which have an environment that does not allow welds or other sealing means to keep their integrity due to thermal expansion and contraction caused by the heat associated with a boiler.

By way of example, ISOMEMBRANE® has been credited with reducing slagging and improving the operational condition of a boiler in Alabama which resulted in saving the boiler operations nearly $1.7 million dollars annually. However, ISOMEMBRANE® uses a refractory ceramic fibre (RCF) which has been known to cause irritation of the skin, eyes and upper respiratory tract, and can be inhaled and deposited in the lungs if the RCF is fine enough. It has also been alleged that RCFs can produce lung fibrosis, lung cancer, and also mesothelioma following long-term inhalation.

Therefore, it is desirable to have a boiler sealer which has the advantages of ISOMEMBRANE without having RCFs in its construction or composition.

SUMMARY OF THE INVENTION

This object of the present invention is accomplished by providing a seal for use in high temperature environments of a boiler assembly to remedy cracks and air leaks, the seal comprising a high temperature RTV silicone adhesive sealant layer; a first non-ceramic layer mounted to the RTV silicone adhesive sealant layer; a first expanded metal layer mounted to the first non-ceramic layer; a first silicone cloth layer mounted to the first expanded metal layer; a metal reinforcement layer mounted to the first silicone cloth layer to provide structural integrity without the use of ceramic materials; a second expanded metal layer mounted to the metal reinforcement layer; a second non-ceramic layer mounted to the second expanded metal layer; a turbine mesh layer mounted to the second non-ceramic layer; a second silicone cloth layer mounted to the turbine mesh layer; a sealing castable applied over the second silicone cloth layer to provide a covering; and, a high temperature bonding adhesive disposed between each layer following the first non-ceramic layer to bind the layers together.

In a further advantageous embodiment, the first non-ceramic layer consists of ISOBLANKET-E material, and the second non-ceramic layer consists of ISOBLANKET-E material.

In a further advantageous embodiment, the high temperature bonding adhesive sealant applied between each layer consists of ISOBOND-E.

In a further advantageous embodiment, the sealing castable consists of ISOCOAT.

In a further advantageous embodiment, the invention provided for a seal for use in high temperature environments of a boiler assembly to remedy cracks and air leaks for expansion joints, the seal comprising a lattice of support studs and support bars having a plurality of support posts extending outwardly there from, wherein the lattice is secured to a desired area of the boiler assembly; a high temperature RTV silicone adhesive sealant layer applied to the lattice; a first non-ceramic layer mounted to the support posts over the RTV sealant layer; a first expanded metal layer mounted to the support posts and applied to the first non-ceramic layer; one of a first silicone cloth layer and a first foil layer mounted to the support posts and applied to the first expanded metal layer; a second non-ceramic layer mounted to the support posts and applied to the first silicone cloth layer or the first foil layer; a turbine mesh layer mounted to the support posts and applied to the second non-ceramic layer; one of a second silicone cloth layer and a second foil layer mounted to the support posts and applied to the turbine mesh layer; a second expanded metal layer mounted to the support posts and applied to the second silicone cloth layer or the second foil layer; a high temperature bonding adhesive disposed between each layer to bind the layers together; and, securing members operatively associated with the support posts to secure the first non-ceramic layer, the first expanded metal layer, the first silicone cloth or foil layer, the second non-ceramic layer, the turbine mesh layer, the second silicone cloth or foil layer and the second expanded metal layer against the lattice.

In a further advantageous embodiment, the first non-ceramic layer consists of ISOBLANKET-E material, and the second non-ceramic layer consists of ISOBLANKET-E material.

In a further advantageous embodiment, the high temperature bonding adhesive sealant applied between each layer consists of ISOBOND-E.

In a further advantageous embodiment, the invention provides for a seal for use in high temperature environments of a boiler assembly to remedy cracks and air leaks for dead air space, the seal comprising a lattice of support studs and support bars having a plurality of support posts extending outwardly there from, wherein the lattice is secured to a desired area of the boiler assembly; a high temperature adhesive layer applied to the lattice; a first non-ceramic layer carried by the support posts adjacent the adhesive layer; a turbine mesh layer carried by the support posts adjacent the first non-ceramic layer; an expanded metal layer carried by the support posts following the turbine mesh layer; a sealing castable applied over the expanded metal layer to provide a covering; and, securing members operatively associated with the support posts to secure the first non-ceramic layer, the turbine mesh layer, the expanded metal layer and the sealing castable against the lattice.

In a further advantageous embodiment, the high temperature adhesive layer consists of ISOBOND-E.

In a further advantageous embodiment, the first non-ceramic layer consists of ISOBLANKET-E material.

In a further advantageous embodiment, a second non-ceramic layer is disposed between the turbine mesh layer and the expanded metal layer carried by the support posts.

In a further advantageous embodiment, the sealing castable consists of ISOCOAT.

In a further advantageous embodiment, the invention provides for a seal for use in high temperature environments of a boiler assembly to remedy cracks and air leaks, the seal comprising a lattice of support studs and support bars having a plurality of support posts extending outwardly there from, wherein the lattice is secured to a desired area of the boiler assembly; a high temperature RTV silicone adhesive sealant layer applied to the lattice; a first expanded metal layer carried by the support posts adjacent the RTV sealant layer; a first silicone cloth layer carried by the support posts adjacent the first expanded metal layer; a non-ceramic layer carried by the support posts adjacent the first silicone layer; a turbine mesh layer carried by the support posts adjacent the first non-ceramic layer; a second silicone cloth layer carried by the support posts adjacent the turbine mesh layer; a second expanded metal layer carried by the support posts adjacent the second silicone cloth layer; and, securing members operatively associated with the support posts to secure the first expanded metal layer, the first silicone cloth, the non-ceramic layer, the turbine mesh layer, the second silicone cloth and the second expanded metal layer against the lattice.

In a further advantageous embodiment, the non-ceramic layer consists of ISOBLANKET-E material.

In a further advantageous embodiment, a high temperature bonding adhesive is disposed between each layer to bind the layers together.

In a further advantageous embodiment, the high temperature adhesive layer consists of ISOBOND-E.

In a further advantageous embodiment, the invention provides for a method for installing a seal for use in high temperature environments of a boiler assembly to remedy cracks and air leaks for expansion joints, the method comprising the steps of providing a lattice of support studs and support bars having a plurality of support posts extending outwardly there from; securing the lattice to a desired area of the boiler assembly; applying a high temperature RTV silicone adhesive sealant layer to the lattice; applying a first non-ceramic layer onto the support posts; applying a first expanded metal layer onto the support posts adjacent the first non-ceramic layer; applying one of a first silicone cloth layer and a first foil layer onto the support posts adjacent the first expanded metal layer; applying a second non-ceramic layer onto the support posts adjacent the first silicone cloth layer or the first foil layer; applying a turbine mesh layer onto the support posts adjacent the second non-ceramic layer; applying one of a second silicone cloth layer and a second foil layer onto the support posts adjacent the turbine mesh layer; applying a second expanded metal layer onto the support posts adjacent the second silicone cloth layer or the second foil layer; applying a high temperature bonding adhesive between each layer to bind the layers together; and, securing the first non-ceramic layer, the first expanded metal layer, the first silicone cloth or foil layer, the second non-ceramic layer, the turbine mesh layer, the second silicone cloth or foil layer and the second expanded metal layer against the lattice.

In a further advantageous embodiment, the invention provides for a method for installing a seal for use in high temperature environments of a boiler assembly to remedy cracks and air leaks for dead air space, the seal comprising providing a lattice of support studs and support bars having a plurality of support posts extending outwardly there from; securing the lattice to a desired area of the boiler assembly; applying a high temperature adhesive layer to coat all exposed surfaces of the lattice; applying a first non-ceramic layer onto the support posts; applying a turbine mesh layer onto the support posts adjacent the first non-ceramic layer; applying an expanded metal layer onto the support posts following the turbine mesh layer; applying a sealing castable over the expanded metal layer to provide a covering; and, securing the first non-ceramic layer, the turbine mesh layer, the expanded metal layer and the sealing castable against the lattice.

In a further advantageous embodiment, the method includes applying a second non-ceramic layer between the turbine mesh layer and the expanded metal layer onto the support posts.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF THE INVENTION

Figure 1:
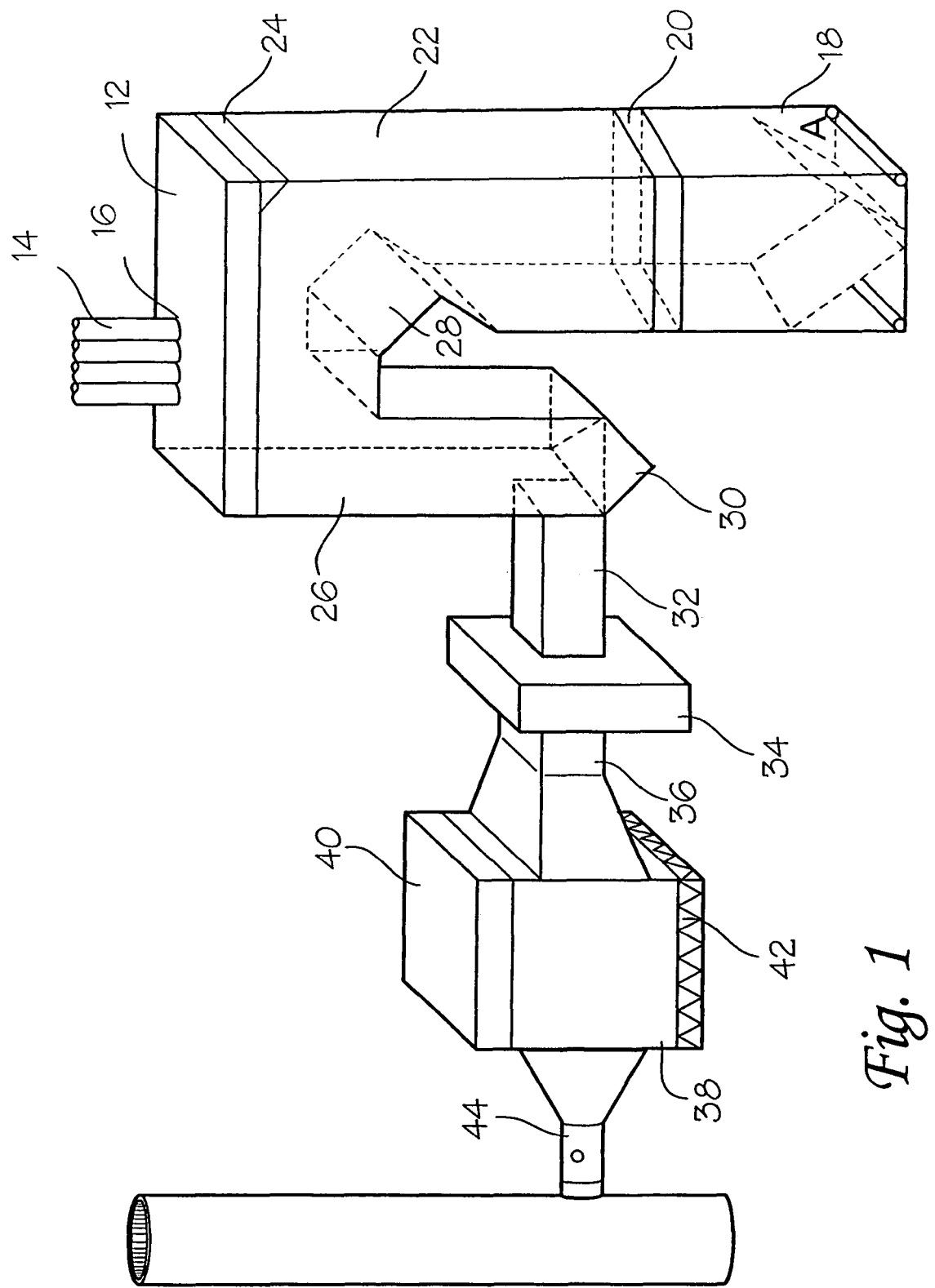
FIG. 1 is a diagram of the environment where the invention can be installed.

Referring to FIG. 1, the invention comprises a system and method for sealing leaks and cracks, particularly those which develop in a boiler. A boiler can have a penthouse, shown generally as 10, having a floor 12 and pipes 14 extending through the floor of the penthouse. The junction 16 between the penthouse floor and the pipes is an area that, due to thermal effects, experiences multi-plane movement and develops cracks during the operation of the boiler. Other areas of a boiler that can benefit from the present invention include a lower vestibule 18, a combustion air duct 20, a casing 22, a drum vestibule 24, a convection pass casing 26, a nose arch vestibule 28, an ash hopper 30, a flue gas ducting 32, an air heater 34, a precipitator inlet 36, a precipitator casing 38, a precipitator penthouse 40, a precipitator casing 42, and a precipitator outlet 44. Any area which develops air leaks or cracks due to thermal expansion or any ductwork expansion joint in a boiler can benefit from this invention.

Figure 2:
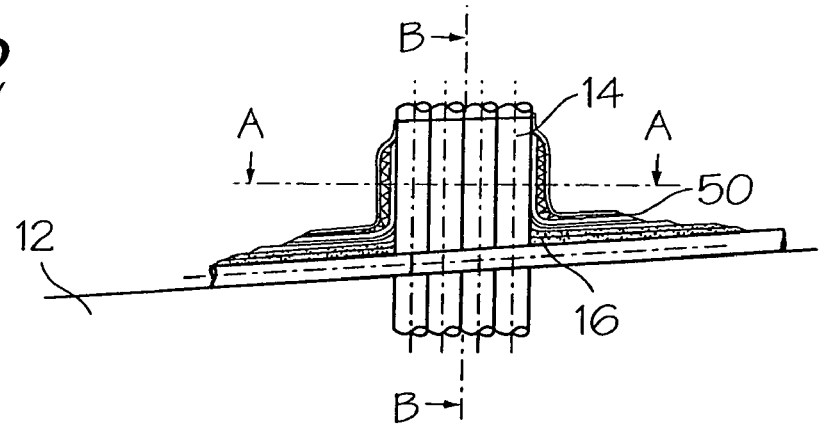
FIG. 2 is a side cross-section view of the penthouse of a boiler.
Figure 2A:
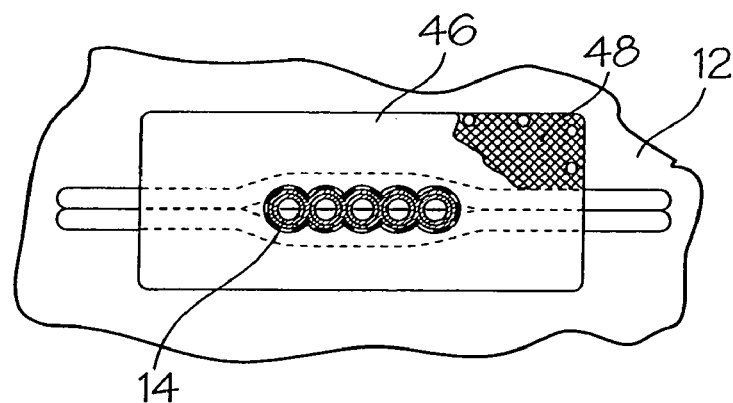
FIG. 2A is top plan view of the penthouse of a boiler.
Figure 2B:
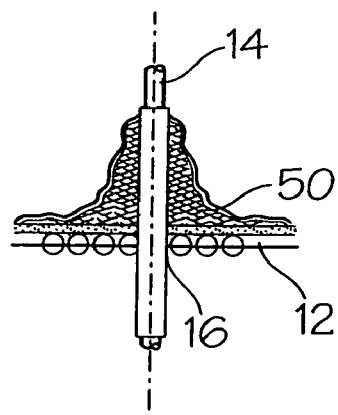
FIG. 2B is an alternative side cross-section view of the penthouse of a boiler.

Referring to FIG. 2, a side cross-section view is shown of an embodiment of the invention installed on a penthouse of a boiler. Penthouse floor 12 is shown carrying pipes 14. Cracks and air leaks can develop in area 16. To remedy these air leaks and cracks, the layers of the invention are shown as 50 covering area 16. In FIG. 2A, a top view of penthouse floor 12 with pipes 14 extending through the floor is shown. A sealing casting 46 such as ISOCOAT-E is shown covering expanded metal 48 providing the seal on the penthouse penetrations. FIG. 2B is a cross section along lines B of FIG. 2. In FIG. 2B, pipes 14 are shown extending through the penthouse floor 12. The layers of the invention shown as 50 are illustrated covering the area 16 which may contain cracks or air leaks.

Figure 3:
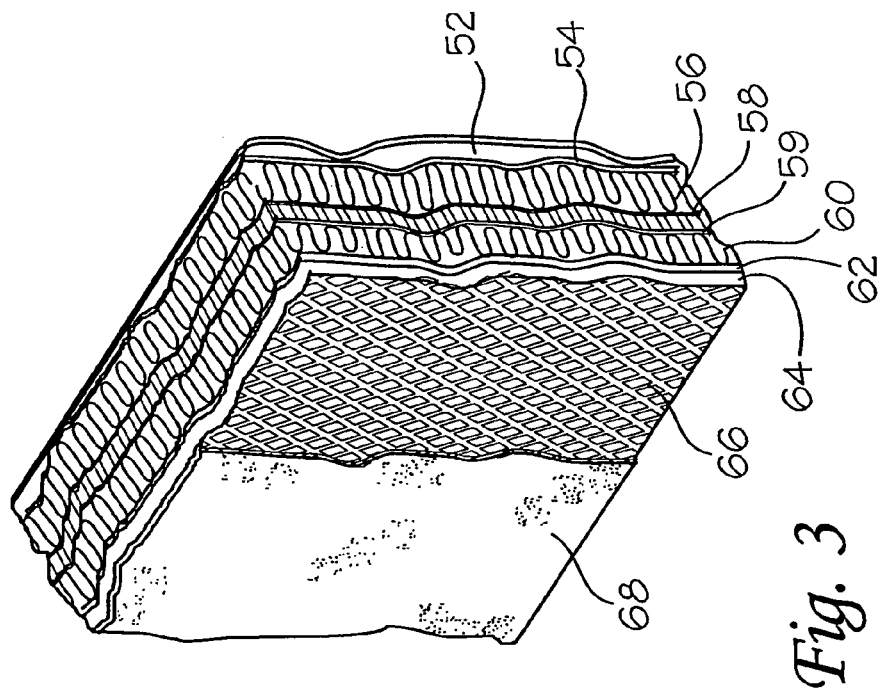
FIG. 3 is a perspective cut-away view of the seal layers according to the present invention.

Referring now to FIG. 3, the several layers of the invention are shown which are installed on boiler assemblies to remedy cracks and air leaks. In one embodiment of the invention, the several layers include a high temperature RTV Silicone Adhesive sealant 52, preferably of the type containing among other things silica, amorphous (fumed) and methyltriactoxysilane, which is commonly available in the marketplace. A first non-ceramic layer 54 of ISOBLANKET-E is then applied which is used for high temperature application and water soluble for safety concerns. These products are non-respirable, offer zero shot content, and offer exceptional tensile strengths. Silica blankets are highly resilient, and offer resistance to degradation due to vibrations. Further, such blankets can actually increase in strength under heightened temperatures. It is advantageous to use such non-ceramic blankets as ceramic layers contain health risks that are not present with these non-ceramic blankets. Next, a first expanded metal layer 56 is provided adjacent to the first non-ceramic layer 54. In a further embodiment, first expanded metal layer 56 includes a first silicone cloth (Sil cloth) 58. A second expanded metal layer 60 as well as a second non-ceramic layer 62 of ISOBLANKET-E can be included thereafter. A turbine mesh layer 64 can be included as well as a second silicone cloth layer 66. The layers can be sealed with a sealing castable 68 for covering. Further, between each layer can be a high temperature sealant such as ISOBOND-E® which is available from High Temperature Technologies. Since non-ceramic insulation, while providing health advantages, may not have the structural integrity that is realized from ceramic insulations, in the preferred embodiment, a metal reinforcement layer 59 is placed between the first sil cloth layer 58 and second expanded metal layer 60 to provide the structural integrity realized form ceramic insulators without having the disadvantages of ceramic materials.

Figure 4:
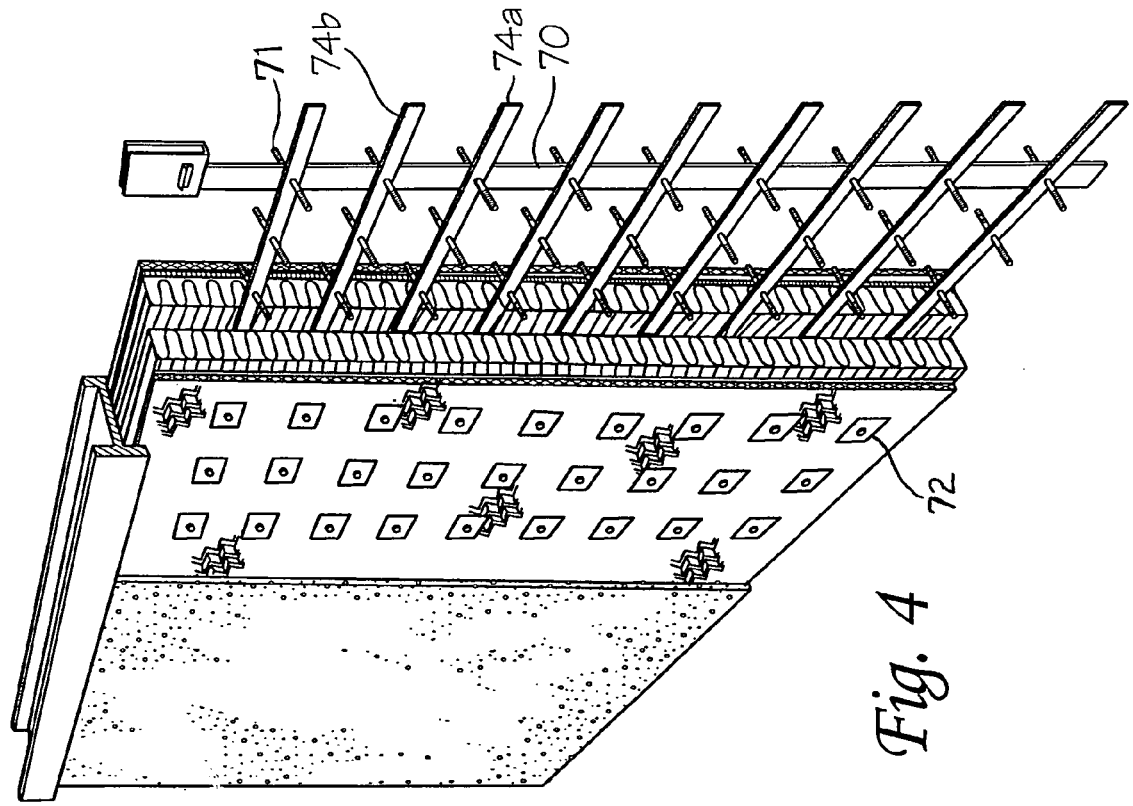
FIG. 4 is a perspective view of some layers of the invention.

Referring to FIG. 4, in some installation, studs 70 are welded or otherwise attached to the boiler for supporting the layers of the present invention. The invention is shown in a vertical installation configuration, for example, against a wall. A support stud 70 having posts 71 is welded or otherwise attached to the boiler assembly. Further support bars such as 74a and 74b, which also carry posts 71, can be added to provide further support for the layers of this invention. The layers of the present invention can then be bolted to the support studs 70 on posts 71 using washers 72 or other fastening member. The layers can be attached to one or both sides of the studs depending on the application as illustrated.

Figure 5:
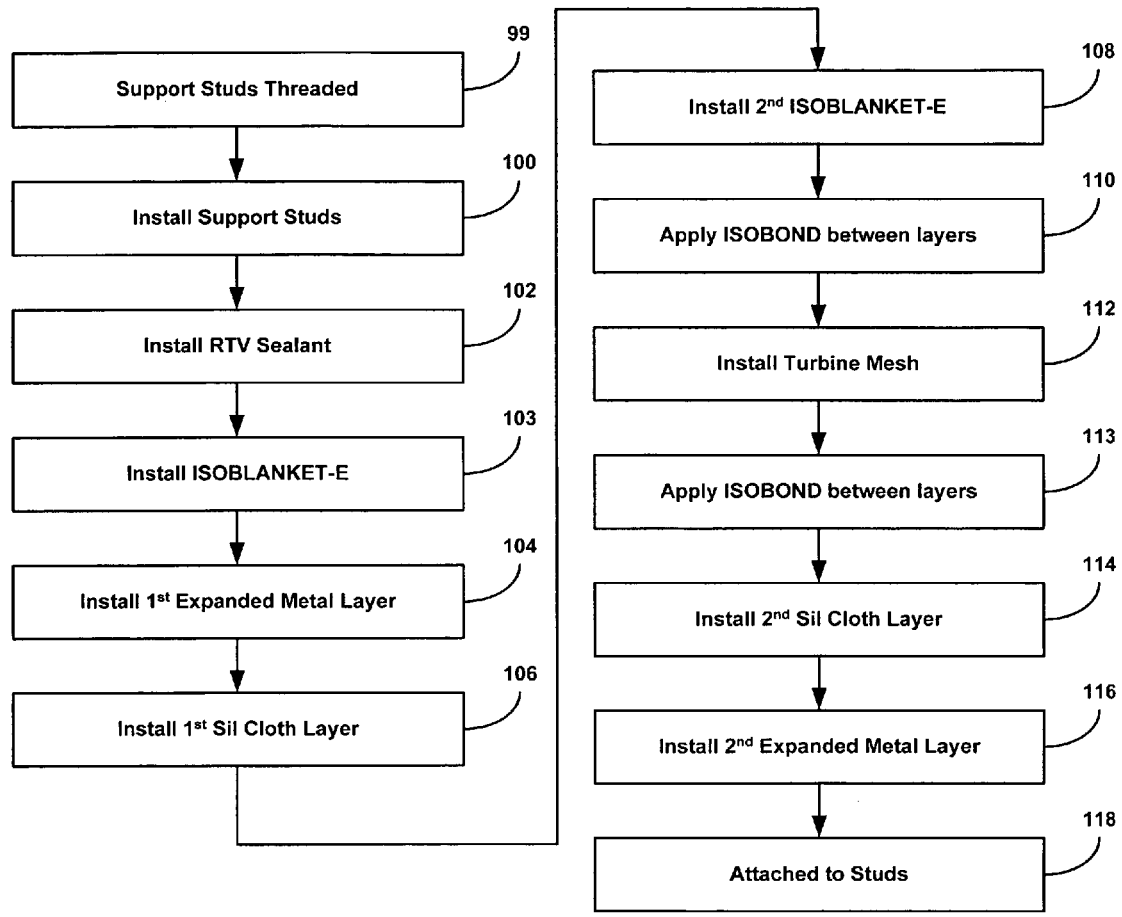
FIG. 5 is a flowchart illustrating the invention.

Referring now to FIG. 5, an installation process is described for expansion joint application, which utilized a modified layer structure. In one embodiment, support studs 70 and support bars 74 are first threaded together at step 99 and installed in the appropriate manner against or around the relevant area of the boiler system at step 100. An RTV sealant layer is place at step 102. A first non-ceramic layer of ISOBLANKET-E is then installed at step 103 over the RTV sealant. A first expanded metal layer is installed over the first non-ceramic layer at step 104. The first Sil cloth layer is then installed over the first expanded metal layer at step 106. A second non-ceramic layer is installed over the sil cloth at step 108. ISOBOND-E® is installed at between layers, as designated at step 110. A turbine mesh 64 is over the second non-ceramic layer at step 112 and ISOBOND-E® can again be installed between these layers at 113. The second Sil cloth can next be added at step 114. A second expanded metal layers is finally added at step 116 and the layers can be attached to the studs at step 118. Again, ISOBOND-E is installed between these an all other layers. Generally, these steps are used to remedy cracks and stop leakages. However, this invention can also be used to fill dead air spaces which are undesirable in a boiler and its environment.

Figure 5A:
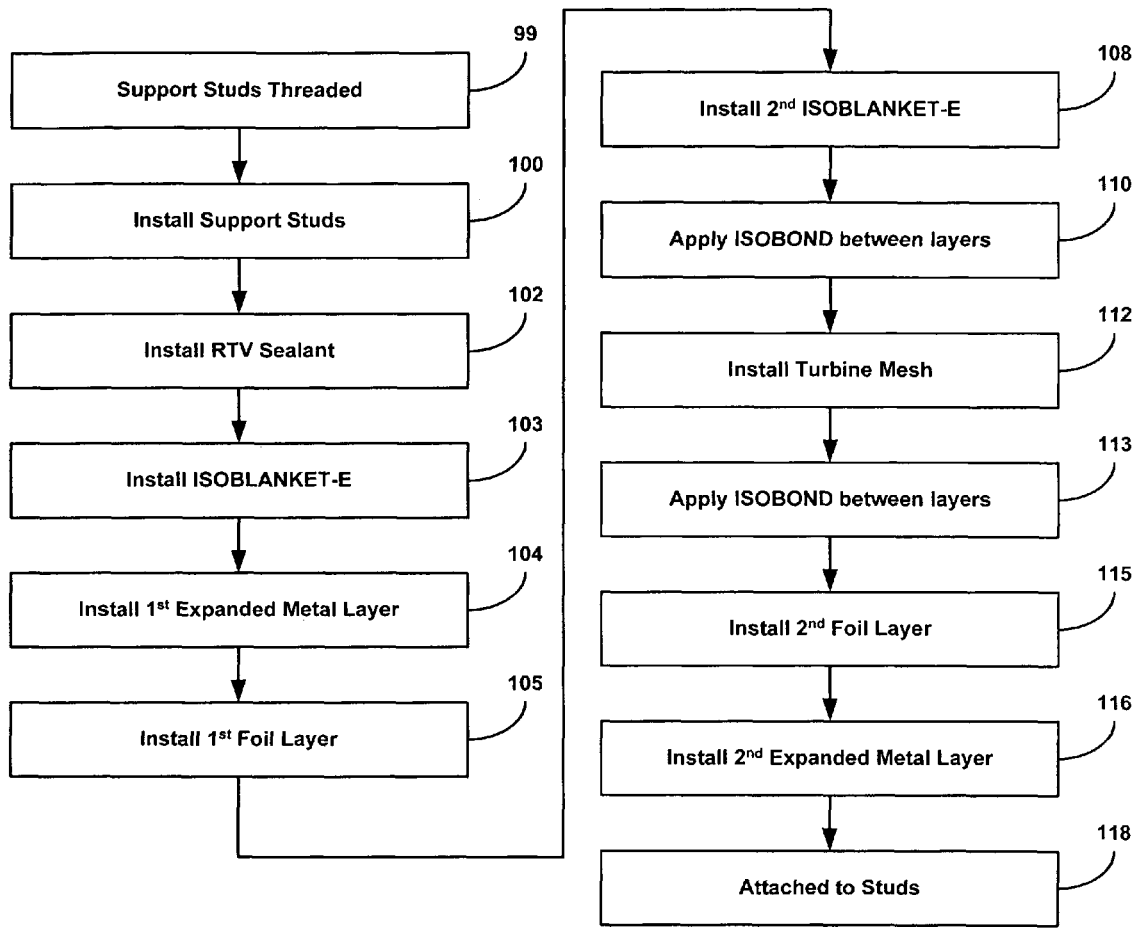
FIG. 5A is a flowchart illustrating the invention.

Referring to FIG. 5A, an alternative arrangement of the invention may also be used to deal with expansion joint issues. Instead of using Sil cloth at steps 106 and 114 of FIG. 5, foil is used. After the first expanded metal layer is installed at 104, a first foil layer is installed at 105. Therefore, a first foil layer is substituted for a first Sil cloth layer. Further, after a second ISOBOND layer is installed at 113, a second foil layer 115 is installed. Again, Sil cloth is substituted with foil layer and ISOBOND is applied between all other layers.

Figure 6:
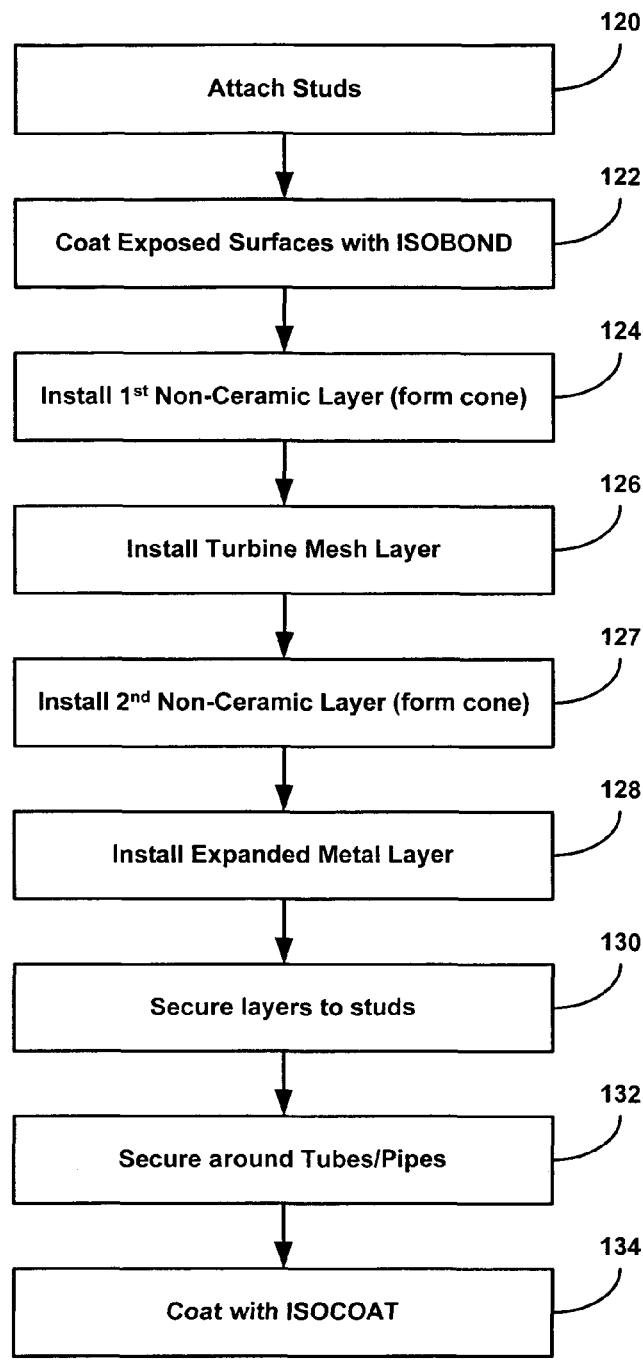
FIG. 6 is a flowchart illustrating the invention.

Referring to FIG. 6, this invention is further described for use in filling dead air space in a boiler environment. When used to fill dead air spaces, the process is similar to that for remedying cracks or leakages, but with a different layer arrangement. Studs are installed at step 120. Exposed surfaces are coated with ISOBOND-E® at step 122. Install a first non-ceramic layer at step 124 and in one embodiment using the non-ceramic layers to build a cone. Turbine mesh can be added at step 126 to the first non-ceramic layer. A second non-ceramic layer is then applied over the turbine mesh in step 127. An expanded metal layer can be added at step 128 over the second non-ceramic layer. The layers are secured to the studs at step 130 and wire ties can be used to secure the sealant layers around tubes at step 132. In step 134, the seal can be coated with ISOCOAT® which is available from High Temperature Technologies, Inc.

Figure 7:
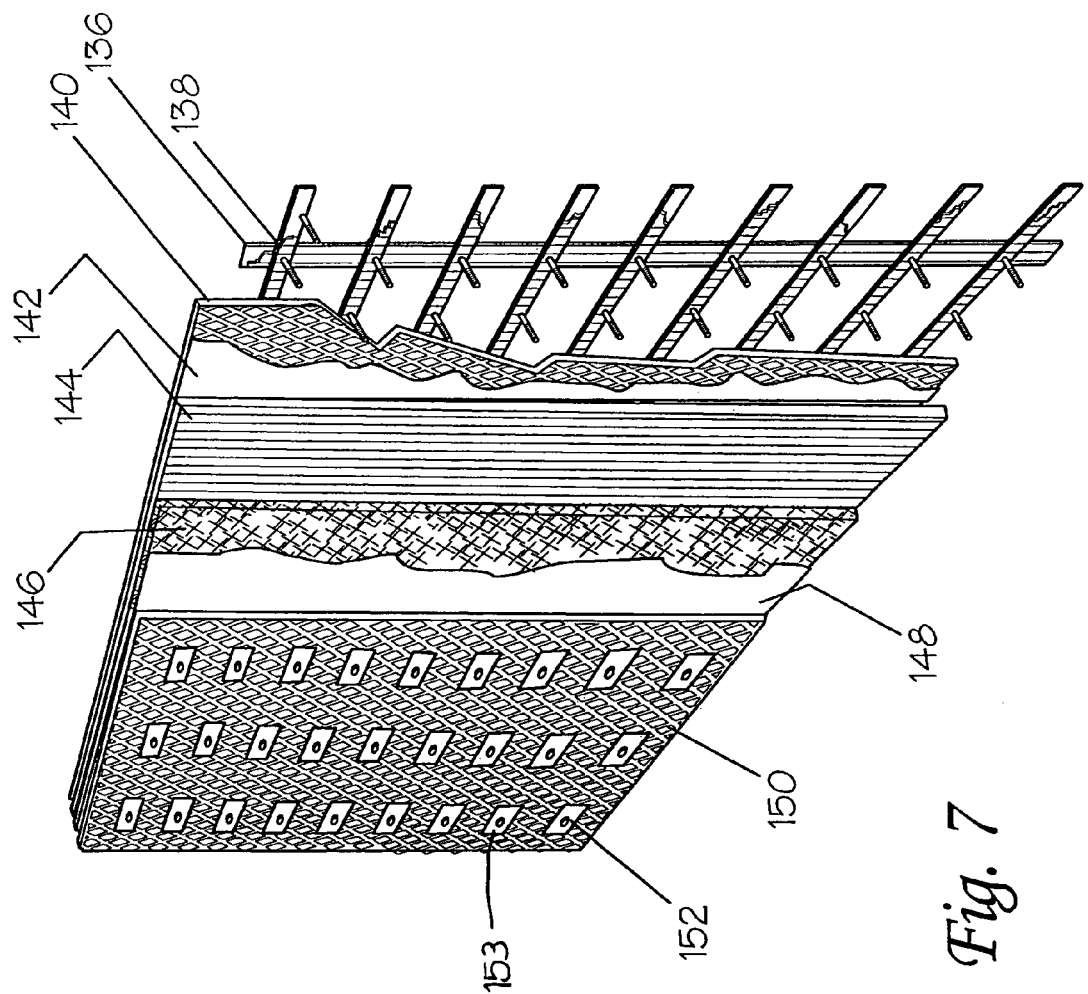
FIG. 7 is a perspective view of the invention.

Referring to FIG. 7, in an alternative arrangement for wall application, studs 136 are shown installed in a boiler environment. RTV 138 is shown applied to the studs. First expanded metal layer is shown as 140, first Sil cloth layer is shown as 142 and first non-ceramic layer is shown as 144. Turbine mesh is shown as 146. Second Sil cloth is shown as 148 and second expanded metal layer is shown as 150. The layers are attached to posts 152 using washers 153 which are carried by studs 136. Studs 136 are secured to the wall for installation.

Figure 8:
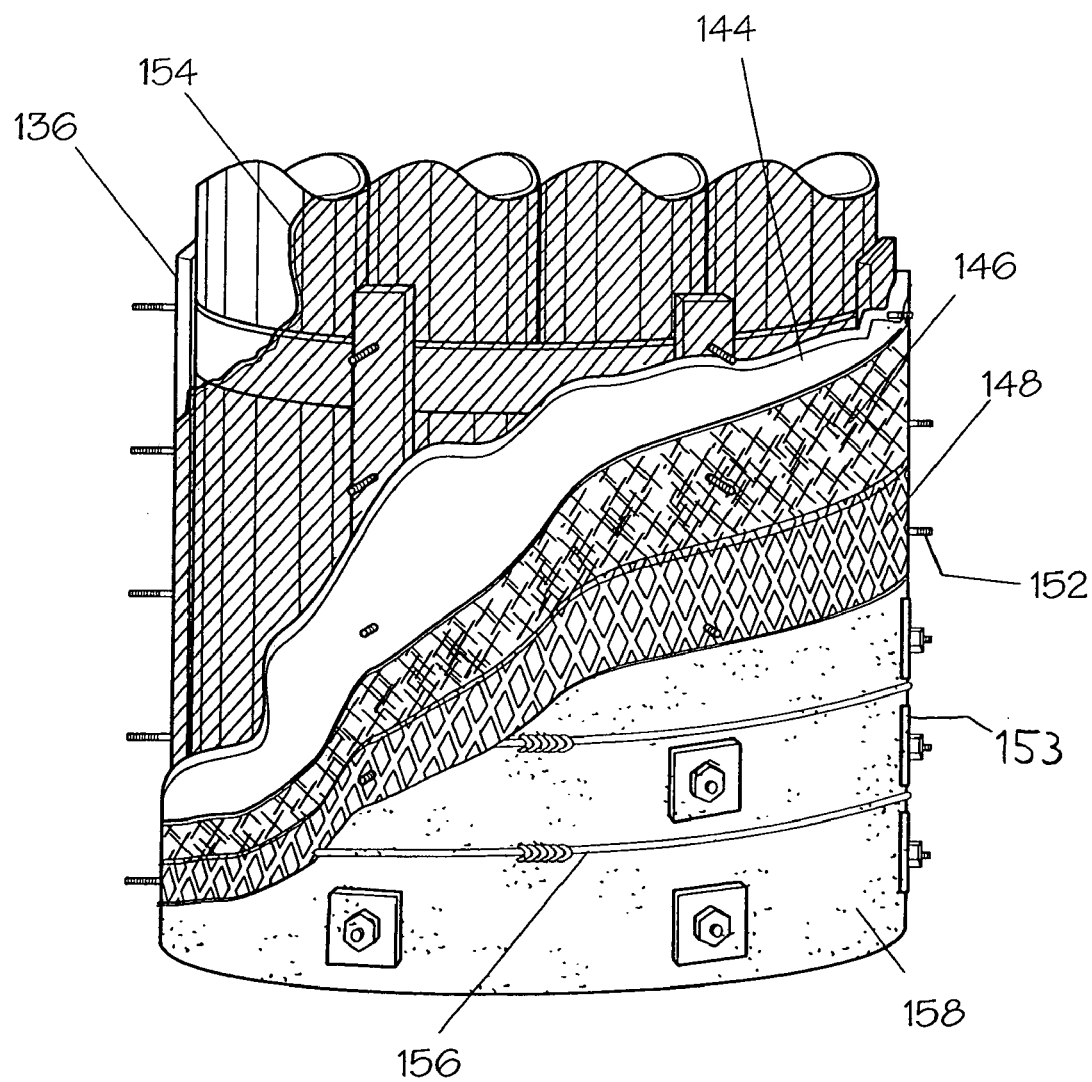
FIG. 8 is a perspective view of the invention.

Referring to FIG. 8, studs 136 are shown having posts 152 is shown in a circulate configuration. This configuration can be used to not only remedy leaks and cracks, but also to fill "dead-air" spaces. The material to be covered can be coated with ISOBOND-E® coating shown as 154. A non-ceramic layer 144, turbine mesh 146, and a first expanded metal layer 148 are coasted with ISOCOAT® shown as 158. The layers are enclosed with wire 156 and bolted to posts 152 with washers 153.

It should be understood that this invention is applicable for both remedying expansion joints and filling dead air spaces.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments are described above in detail. The assemblies and methods are not limited to the specific embodiments described herein, but rather, components of each assembly and/or method may be utilized independently and separately from other components described herein.

While the invention has been described in terms of various specific embodiments, those skilled in the art will recognize that the invention can be practiced with modification within the spirit and scope of the claims.

What is claimed is:

1. A seal for use in high temperature environments of a boiler assembly to remedy cracks and air leaks for expansion joints, said seal comprising:
    a lattice of support studs and support bars having a plurality of support posts extending outwardly there from, wherein said lattice is secured to a desired area of the boiler assembly;
    a high temperature RTV silicone adhesive sealant layer applied to said lattice;
    a first non-ceramic layer mounted to said support posts over said RTV sealant layer;
    a first expanded metal layer mounted to said support posts and applied to said first non-ceramic layer;
    one of a first silicone cloth layer and a first foil layer mounted to said support posts and applied to said first expanded metal layer;
    a second non-ceramic layer mounted to said support posts and applied to said first silicone cloth layer or said first foil layer;
    a turbine mesh layer mounted to said support posts and applied to said second non-ceramic layer;
    one of a second silicone cloth layer and a second foil layer mounted to said support posts and applied to said turbine mesh layer;
    a second expanded metal layer mounted to said support posts and applied to said second silicone cloth layer or said second foil layer;
    a high temperature bonding adhesive disposed between each layer to bind the layers together; and,
    securing members operatively associated with said support posts to secure said first non-ceramic layer, said first expanded metal layer, said first silicone cloth or foil layer, said second non-ceramic layer, said turbine mesh layer, said second silicone cloth or foil layer and said second expanded metal layer against said lattice.

2. The seal of claim 1 wherein said first non-ceramic layer consists of ISOBLANKET-E material.

3. The seal of claim 1 wherein said second non-ceramic layer consists of ISOBLANKET-E material.

4. The seal of claim 1 wherein said high temperature bonding adhesive sealant applied between each layer consists of ISOBOND-E.

5. A seal for use in high temperature environments of a boiler assembly to remedy cracks and air leaks for dead air space, said seal comprising:
    a lattice of support studs and support bars having a plurality of support posts extending outwardly there from, wherein said lattice is secured to a desired area of the boiler assembly;
    a high temperature adhesive layer applied to said lattice;
    a first non-ceramic layer carried by said support posts adjacent said adhesive layer;
    a turbine mesh layer carried by said support posts adjacent said first non-ceramic layer;
    an expanded metal layer carried by said support posts following said turbine mesh layer;
    a sealing castable applied over said expanded metal layer to provide a covering; and,
    securing members operatively associated with said support posts to secure said first non-ceramic layer, said turbine mesh layer, said expanded metal layer and said sealing castable against said lattice.

6. The seal of claim 5 wherein said first non-ceramic layer consists of ISOBLANKET-E material.

7. The seal of claim 6 including a second non-ceramic layer disposed between said turbine mesh layer and said expanded metal layer carried by said support posts.

8. The seal of claim 5 wherein said high temperature adhesive layer consists of ISOBOND-E.

9. The seal of claim 5 wherein said sealing castable consists of ISOCOAT.

10. A seal for use in high temperature environments of a boiler assembly to remedy cracks and air leaks, said seal comprising:
    a lattice of support studs and support bars having a plurality of support posts extending outwardly there from, wherein said lattice is secured to a desired area of the boiler assembly;
    a high temperature RTV silicone adhesive sealant layer applied to said lattice;
    a first expanded metal layer carried by said support posts adjacent said RTV sealant layer;
    a first silicone cloth layer carried by said support posts adjacent said first expanded metal layer;
    a non-ceramic layer carried by said support posts adjacent said first silicone layer;
    a turbine mesh layer carried by said support posts adjacent said first non-ceramic layer;
    a second silicone cloth layer carried by said support posts adjacent said turbine mesh layer;
    a second expanded metal layer carried by said support posts adjacent said second silicone cloth layer; and,
    securing members operatively associated with said support posts to secure said first expanded metal layer, said first silicone cloth, said non-ceramic layer, said turbine mesh layer, said second silicone cloth and said second expanded metal layer against said lattice.

11. The seal of claim 10 including a high temperature bonding adhesive disposed between each layer to bind the layers together.

12. The seal of claim 11 wherein said high temperature adhesive layer consists of ISOBOND-E.

13. The seal of claim 10 wherein said non-ceramic layer consists of ISOBLANKET-E material.

* * * * *